Feb. 17, 1970  D. E. BOUSSO  3,495,502
BELLOWS DEVICES
Filed July 7, 1967  2 Sheets-Sheet 1
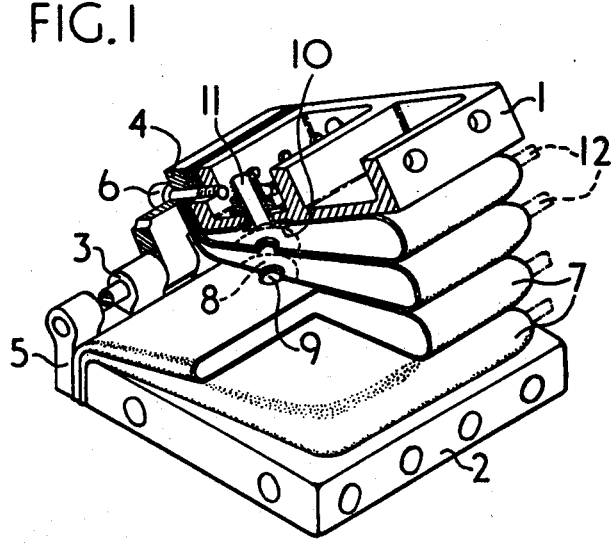
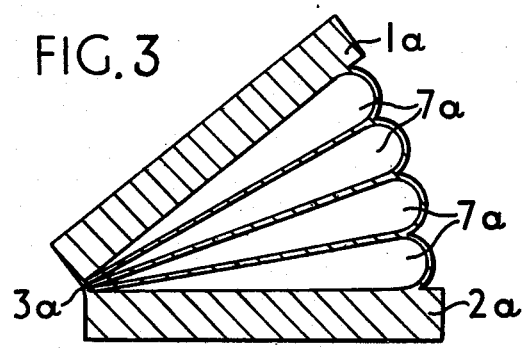
Dino Edwin Bousso
INVENTOR
By Rauber & Lezar
ATTORNEYS

United States Patent Office 3,495,502
Patented Feb. 17, 1970

3,495,502
BELLOWS DEVICES
Dino Edwin Bousso, 34 Aviv St., Carmel, Haifa, Israel
Filed July 7, 1967, Ser. No. 651,894
Claims priority, application Great Britain, July 8, 1966, 30,840/66
Int. Cl. F01b *19/02;* F16j *3/00*
U.S. Cl. 92—39        13 Claims

ABSTRACT OF THE DISCLOSURE

A device for converting fluid pressure to angular mechanical movement or vice-versa, the device comprising at least one pouch of flexible material arranged to contain fluid under pressure and connected to hinge means arranged to restrain radial movement of the pouch relative to the axis of the hinge means.

---

This invention relates to devices for converting fluid pressure to angular mechanical movement or vice-versa and in accordance with the invention such a device comprises at least one pouch of flexible material arranged to contain fluid under pressure and associated with hinge means arranged to restrain radial movement of the pouch relative to the axis of the hinge means.

According to the invention also the device comprises two end pieces, hinge means by which the end pieces are hinged together and at least one pouch of flexible material between the end pieces arranged to contain fluid under pressure and to take up the shape of a wedge diverging in the radially outward direction relative to the axis of the hinge means when subjected to internal fluid pressure, the pouch being restrained from radial movement relative to the axis of the hinge means.

Where reference is made to "rubber or plastic material" this term is intended to cover volcanised natural or synthetic rubber, polyvinyl chloride, polyethylene, polyurethanes, polyamides or other natural or synthetic polymers suitable for use in the construction of flexible fluid containing structures.

The term "hinge means" as used in this specification is not limited to the common form of hinge in which a pair of rigid hinge members or plates pivotally joined by a hinge pin but includes such alternatives as a flexible joint between a pair of members, for example, a flexible spring or other means securing a pair of members to one another so as to permit relative angular displacement of the members.

With the arrangement in accordance with the invention the normal advantages associated with bellows are available but with the additional feature of angular movement. Thus, relative movement of the end pieces is associated with a change in volume of the pouch, but since the pouch is made of flexible material, it produces substantially no preloading and therefore no resistance to relative movement of the end pieces. The flexibility of the pouch enables it to be expanded to its full size by the fluid pressure and the pouch faces act as diaphragms or bulkheads which in the case of a multiple-pouch bellows construction tie the side walls of the bellows together at intervals and prevent the walls from bulging outwards away from one another.

Since the edges of the pouches, adjacent to the hinge axis, are positively located relatively to the hinge axis, the pouch faces forming the diaphragms then positively locate the radially outermost edges of the pouches at a fixed distance from the hinge axis and positively prevent the pouches from being squeezed radially outwards between the end pieces. Also, there is then no possible relative movement between the pouch end faces and the end pieces, or between adjacent pouch faces, and indeed these parts may be bonded together.

If the edges of each pouch other than that adjacent to the hinge axis are formed by a homogeneous continuity of material from one face of the pouch to the other, whereby when the pouch is expanded by fluid pressure, an uninterrupted curve is provided around these edges of the pouch, the tensile strength of the pouch material is utilised optimally and the optimum condition of stress distribution in the cell walls resulting from the fluid pressure is approached. This effect may be achieved by forming each pouch as a separate moulding having an open edge which is subsequently sealed and forms the edge of the pouch adjacent to the hinge axis. The open edge of the pouch may be heat sealed or otherwise bonded or it may alternatively or in addition be clamped between a hinge plate and one end piece.

In an alternative construction, the or a number of the pouches, and possibly also the hinge and even the end pieces, are formed by an integral extrusion, the extrusion direction being parallel to the hinge axis, after which the edges of the pouches extending radially from the hinge axis of the device are sealed. This enables a bellows of any suitable length, in a direction parallel to the hinge axis, to be prepared by cutting a suitable length off the extrusion.

The device has a high energy transfer "weight of material" ratio and has a wide range of uses and sizes. For example it may be used as an angular actuator by supplying fluid pressure to the bellows so that the end pieces are forced apart. Such an actuator may be used in applications as widely varied as the provision of one degree of rotation at a joint in an artificial limb or to the provision of the torque necessary to raise the back of a tipping lorry. Two or more of the pouches may be used in a push-pull relationship, for example to open and/or close end pieces forming the arms of a scissors. The pouches will then be appropriately positioned in the angles between the arms around the scissors axis and will be expanded as necessary.

Rather than be used as a conventional actuator, the device may alternatively be used to pump fluid which is drawn into and expelled from the bellows through appropriately valved ducting, as the end pieces are mechanically moved apart and together respectively. This use of the device can provide a leakproof pump with no fluid to metal contact. Another use of the device is to absorb momentum, in the manner of a shock absorber or spring. When used as a shock absorber, the device may have a sealed bellows, the pouches of which have extensible walls and are filled with a viscous fluid. The energy which is transmitted to the fluid through relative movement of the end pieces towards one another is then absorbed by the internal friction of the fluid. Alternatively with inextensible walls, a throttling valve may be installed at the inlet which connects to a chamber into which the expelled fluid is directed. Various gas-liquid combinations are possible to suit different requirements. The effect of a spring could be obtained by using a low viscosity fluid together with resilient walls or by using a gas or gas-liquid combination together with more or less inextensible walls. By using various combinations, different degrees of damping and springiness can be achieved. The device may also be used as part of a vehicle suspension in which fluid pressure is developed by relative movement between the suspension parts at one corner of the vehicle, and transmitted to another corner to produce a counterbalancing of relative movement between other suspension parts.

When fluid is supplied to or expelled from the pouches, it may flow to and from the pouches through separate ducts leading into the pouches but preferably a common duct, for example provided through one of the end pieces, is provided to the interiors of the pouches which are all in communication with one another in the manner of a conventional bellows. For this purpose the contiguous faces of adjacent pouches will be sealed together, at least around an aperture through which the pouches are in communication with one another.

Three examples of devices constructed in accordance with the invention are illustrated in the accompanying drawings, in which:

FIGURE 1 is a diagrammatic perspective view of the first example with parts broken away in section;

FIGURE 3 is a diagrammtic radial section through a second example, and

Figure 2:
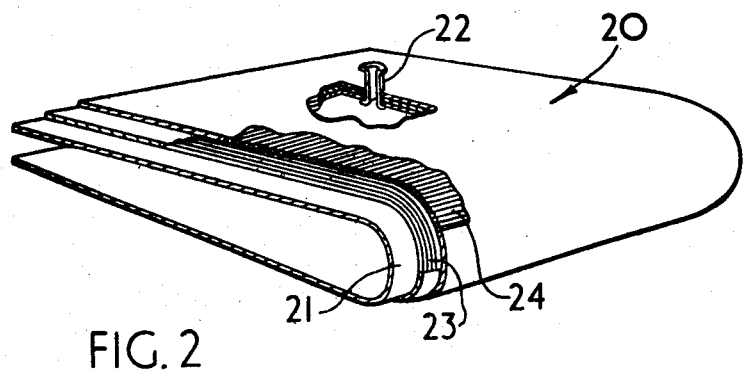
FIGURE 2 is a diagrammatic perspective view showing one method of pouch construction.

The actuator illustrated in FIGURE 1 consists of metal end plates 1 and 2, forming the end pieces, which are joined together by means of a metal hinge 3 having hinge plates 4 and 5 which are respectively screwed by screws 6 to the edges of the plates 1 and 2.

In this example the bellows between the end plates 1 and 2 consists of four pouches 7 which are each formed from natural or synthetic cord fabric, coated and impregnated with plastic or rubber. The radially outermost and radially extending edges of the pouches are each formed as a continuous homogeneous curve as the radially innermost edges of the pouches are moulded open but subsequently sealed with bonding material and clamped, two between the hinge plate 4 and the end plate 1, and the other two between the hinge plate 5 and end plate 2. The side faces of each pouch are parallel when moulded but the pouch is constrained to a wedge shape when pressurised because of the edges which are clamped adjacent to the hinge 3.

The adjacent faces of the pouches 7 are bonded together over an annular area 8 surrounding a hole 9 through which the cell formed by the interior of one pouch is in communication with the cell formed by the interior of the next pouch. The pouch face contiguous with the end plate 1, is bonded to the end plate and is additionally clamped by a flange 10 on a screw threaded tubular spigot 11 which leads through the end plate 1 into the interior of the first bellows pouch, and hence into the interior of all the pouches which are in communication with one another through the holes 9. If desired a similar spigot 11 may be provided through the other end plate 2 into the other end pouch 7.

Instead of providing the tubular spigot 11, and the holes 9, fluid may be supplied to and expelled from the pouches 7, through separate flexible hoses 12 one leading into a corner of each of the pouches 7, as suggested in chain dotted lines. In this case the adjacent faces of the pouches need not be bonded together.

If the device is to be used as a rotary actuator at the joint in an artificial limb, such as an elbow joint, the end plate 1 will be rigidly fixed to the artificial upper arm and the end plate 2 to the artificial forearm. When fluid under pressure, such as compressed air, or oil from a hydraulic pump, is then fed to the interior of the bellows through the duct 11 or hoses 12, the pouches will be expanded and the bellows extended so that the plates 1 and 2 are swung apart to bend the elbow. The limb is subsequently straightened again by releasing the fluid pressure to the bellows and providing a return spring to urge the plates 1 and 2 together again as the bellows collapses. If the device is to be used as a pump, the oil or other fluid may be drawn into the bellows through the spigot 11 or hoses 12 as the plates 1 and 2 are mechanically opened, and subsequently expelled from the bellows as the plates 1 and 2 are closed, either through the same spigot 11, or through the similar spigot extending through the plate 2, or through the hoses 12, depending upon the ducting and valve arrangement provided.

If the device is to be used as a shock absorber or spring, the bellows will be filled with fluid through the spigot 11 or hoses 12 which will then be sealed with a screw cap or other closure. The mechanical reaction urging the plates 1 and 2 together, can then be absorbed by internal friction in the fluid or resilient extension of the pouch walls. Alternatively, with inextensible walls, the fluid will be expelled through a throttling valve into a suitable container.

FIGURE 2 shows a preferred form of pouch construction. The pouch 20 comprises an inner lining 21 formed from relatively impermeable material such as butyl rubber or nitrile rubber (for resistance to certain types of mineral oil). The lining 21 is formed first, by known methods, and is provided with a grommet 22 which will, in the assembled bellows, provide communication between adjacent pouches. The grommet 22 is bonded at one end to the lining 21, the other end projecting from the pouch 20 for bonding to the lining of the adjacent pouch in the assembled bellows.

The inner lining 21 is then covered by two layers 23 and 24 of rubberized parallel-cord fabric, the cords in the layer 23 lying at right angles to the hinge axis in the assembled bellows while the cords in the layer 24 lie parallel to the hinge axis. The layers 23 and 24 are built up around the inner lining 21 by normal fabricating methods as used for example in tyre building and are moulded and vulcanised in the known manner, additional reinforcing patches being provided at the corners of the pouch if necessary. The cords from which the layers 23 and 24 are made may be of any suitable material such as rayon, nylon, steel wire or glass fibre.

Where the bellows is to be used with higher fluid pressures in excess of 100 pounds per square inch it may be desirable to keep the inner lining separate from the reinforcement layers 23 and 24 in the finished pouch, but it may alternatively be bonded to the inner surface of the layer 23. For lower pressures, a pouch made from an unreinforced rubber or plastic material, or a dip-moulded pouch reinforced with woven fabric may be used.

The device illustrated in FIGURE 3 is formed as an integral extrusion of thermoplastic material, the extrusion providing pouches 7a, blocks 1a and 2a forming the end pieces, and a hinge 3a formed by the film of material joining the blocks 1a and 2a. The extrusion is cut to the required axial length and the radially extending edges of the extrusion are then sealed. This is accomplished by separating the pouches at the edges and then bonding them together by heat or using some other technique.

The pouches alone may be extruded and the end pieces separate parts which are hinged together and between which the extruded pouches are located.

If this device is to be used as a shock absorber, the pouches will be filled with fluid and then sealed. Alternatively permanent ducting for fluid into and out of the pouches may be provided either separately by using hoses such as the hoses 12 shown in FIGURE 1, or by common ducts extending through one or other of the blocks 1a or 2a. In this case the extrusion will be pierced to provide the ducts through the blocks and the common end faces of the pouches, which provide the radially extending diaphragms, will be pierced at the same time so that the interiors of all the pouches are in communication with one another.

Figure 4:
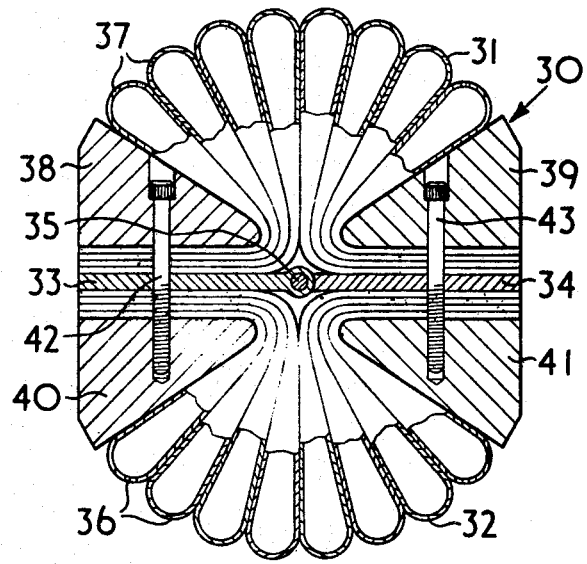
FIGURE 4 is a diagrammatic radial section through a third example.

FIGURE 4 shows one arrangement of a device 30 in accordance with the invention which is capable of providing a push-pull action.

The device 30 comprises a pair of bellows 31 and 32 arranged on opposite sides of a hinge comprising hinge plates 33 and 34 and a hinge pin 35. The pouches 36, 37 which form the bellows 31, 32 are clamped at their radially inner edges between triangular-section end pieces 38, 39, 40, 41 and the hinge plates 33, 34 by screws 42, 43.

The device 30 is in the form of a scissors arrangement, in which the end pieces and hinge plates can be moved angularly relative to one another in either direction by supplying fluid pressure through connections (not shown) to an appropriate pouch.

Having now described my invention, what I claim is:

1. A device for converting fluid pressure to angular mechanical movement and vice-versa, the device comprising two end pieces, hinge means by which the end pieces are hinged together, and a plurality of pouches of flexible material between the end pieces and arranged to contain fluid under pressure, each of said pouches having an open end and being a pouch formed as a single wedge shaped chamber extending from the hinge axis and diverging in the radially outward direction relative to the axis of the hinge means when subjected to internal fluid pressure, said flexible material being restrained from radial movement with the material of each of said pouches extending radially inwardly relative to the hinge axis to a position adjacent the hinge axis and being secured to the hinge means at said position to restrain radial movement of the pouch relative to the axis of the hinge means, and wherein said pouches are each formed with closed outer axially extending edges forming an uninterrupted outer end when said pouches are expanded by fluid pressure and wherein said pouches are each formed with axially extending innermost edges at said open end, said inner edges being secured between said end pieces and said hinge to close said open end.

2. A device according to claim 1 wherein each pouch is formed from flexible polymeric material.

3. A device according to claim 2 wherein each pouch includes a cord reinforcement.

4. A device according to claim 1 wherein each pouch is formed from two or more layers of flexible polymeric material each of which includes a cord reinforcement in which the cords lie parallel to one another, the cords in one layer being disposed in a different direction relative to the cords in another layer.

5. A device according to claim 4 wherein the cords in one layer are disposed substantially at right angles to the axis of the hinge means and the cords in the other layer are disposed substantially parallel to the axis of the hinge means.

6. A device according to claim 1 wherein each pouch includes an inner lining of relatively impermeable material together with at least one outer layer of flexible polymeric material including a cord reinforcement.

7. A device according to claim 2 wherein each pouch includes a woven fabric reinforcement.

8. A device according to claim 1 wherein means are provided for enabling fluid pressure to be supplied to each pouch.

9. A device according to claim 8, adjacent pouches having an opening in their contiguous radially extending faces to provide communication between the pouches.

10. A device according to claim 9 wherein said opening is formed in a grommet sealed to each of the adjacent pouches.

11. A device according to claim 10 wherein the adjacent pouches each comprise an inner lining of relatively impermeable material and wherein the grommet is sealed to the inner linings of the adjacent pouches.

12. A device according to claim 9 wherein a duct is provided through one of the end pieces for the supply of fluid to, or the withdrawal of fluid from, the interior of all the pouches.

13. A device according to claim 1 wherein at least two pouches are arranged on opposite sides of the hinge means in a scissors arrangement, whereby the end pieces can be moved angularly relative to one another in either direction by fluid pressure supplied to an appropriate pouch.

References Cited

UNITED STATES PATENTS

| | | | |
|---|---|---|---|
| 1,044,678 | 11/1912 | Manning | 92—91 X |
| 1,325,500 | 12/1919 | Gustafson | 92—37 |
| 1,515,702 | 11/1924 | Reybold | 92—103 X |
| 1,579,183 | 3/1926 | Weiland | 92—34 X |
| 2,711,315 | 6/1955 | Mosebach | 92—47 X |
| 2,734,009 | 2/1956 | Coffey | 92—103 X |
| 2,991,763 | 7/1961 | Marette | 92—34 X |
| 3,047,257 | 7/1962 | Chester | 92—92 X |
| 3,155,019 | 11/1964 | Stiglic et al. | 92—39 |
| 3,202,061 | 8/1965 | Johnston | 92—64 X |
| 3,379,411 | 4/1968 | Vanderjagt | 92—92 X |

MARTIN P. SCHWADRON, Primary Examiner

IRWIN C. COHEN, Assistant Examiner

U.S. Cl. X.R.

92—34, 47, 92